Jan. 9, 1968　　　　　F. A. GASPARINI　　　　3,362,582
VENDING MACHINE WITH SEPARATELY ACTING, SERIES, ARTICLE
RELEASERS
Filed April 28, 1965　　　　　　　　　　　　12 Sheets-Sheet 1

WITNESSES
Theodore F. Wrobel
James F. Young

INVENTOR
Francis A. Gasparini
BY
Francis B. Blake
ATTORNEY

Jan. 9, 1968  F. A. GASPARINI  3,362,582
VENDING MACHINE WITH SEPARATELY ACTING, SERIES, ARTICLE RELEASERS
Filed April 28, 1965  12 Sheets-Sheet 2
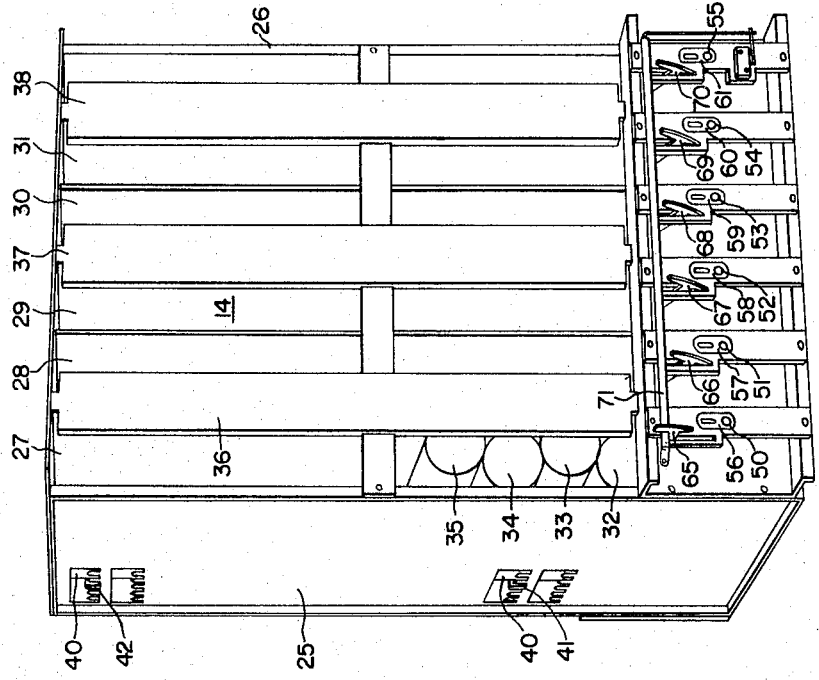
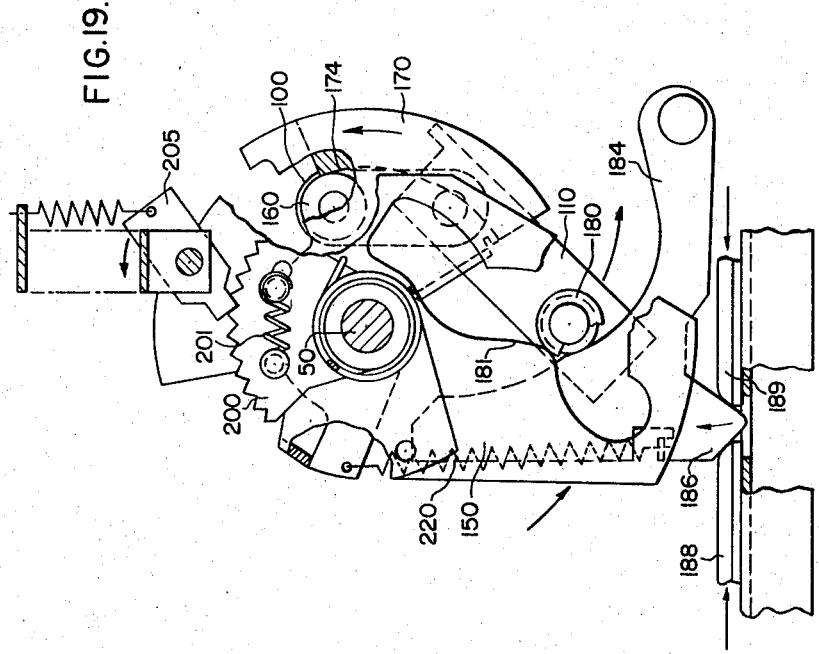

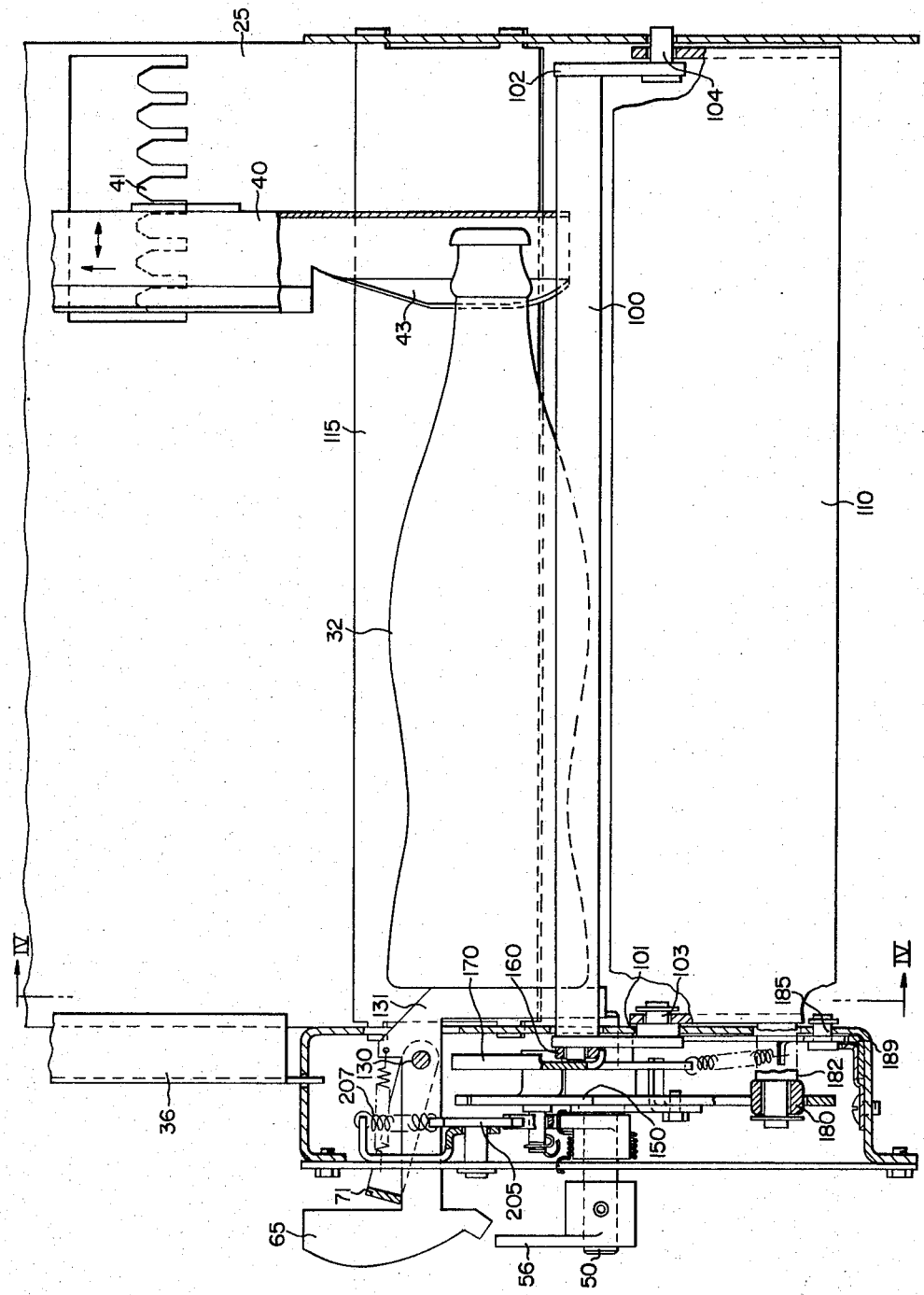

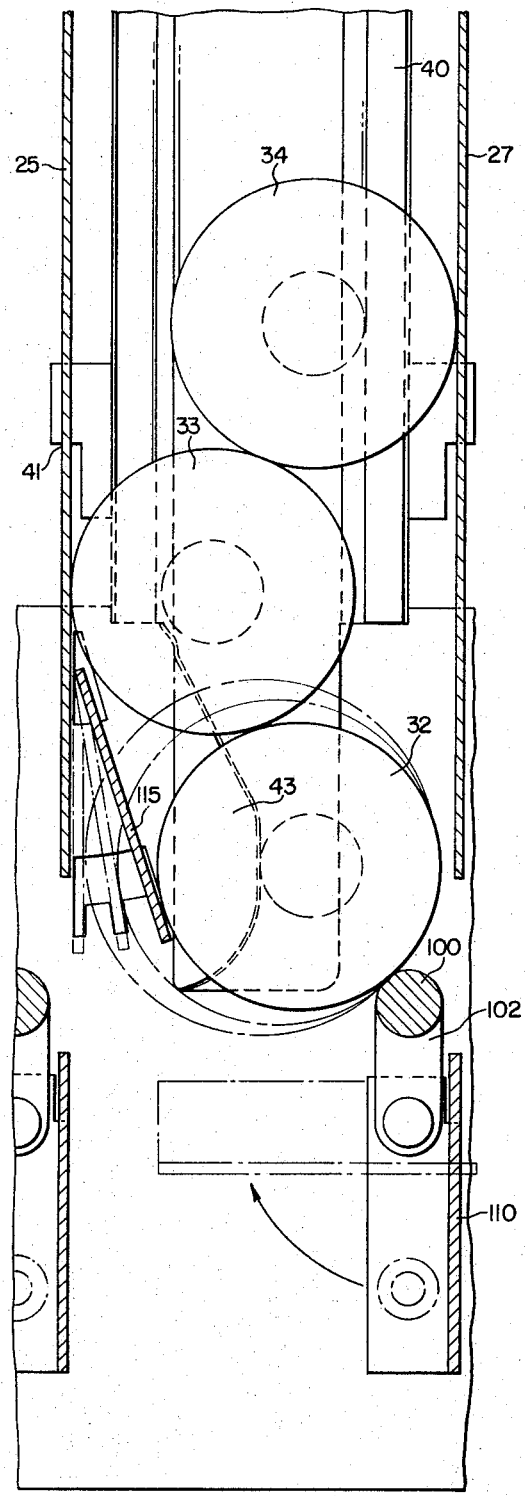
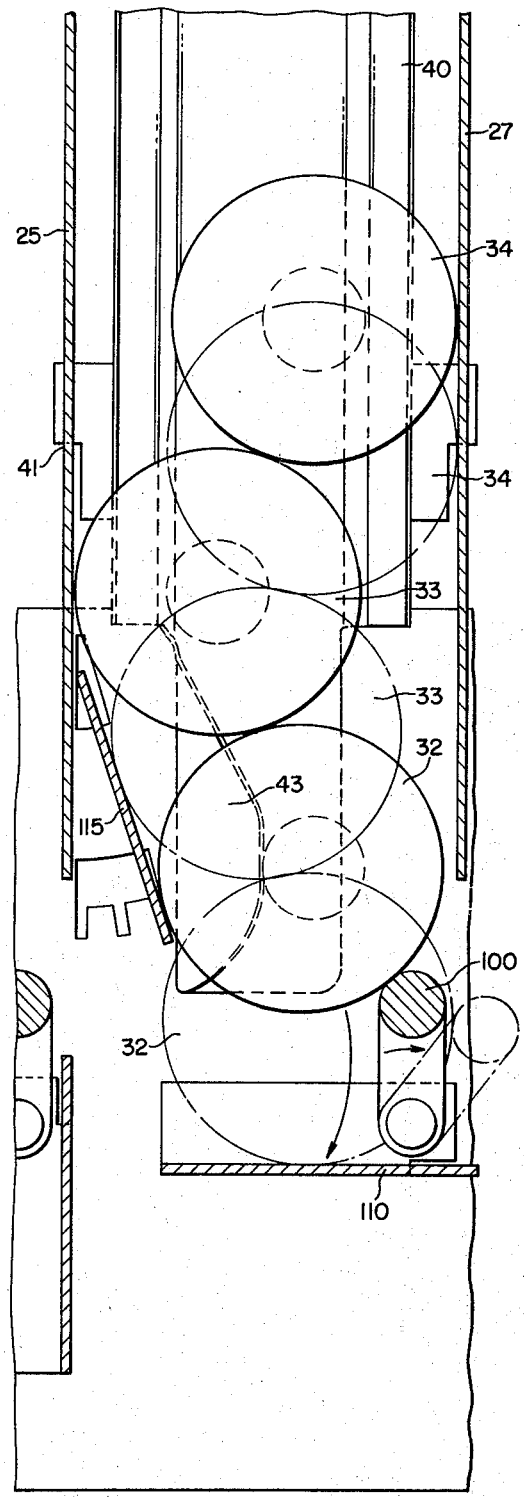
FIG.4.
FIG.5.

Jan. 9, 1968 F. A. GASPARINI 3,362,582
VENDING MACHINE WITH SEPARATELY ACTING, SERIES, ARTICLE
RELEASERS
Filed April 28, 1965 12 Sheets-Sheet 5

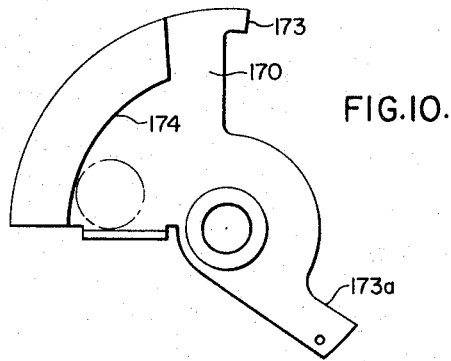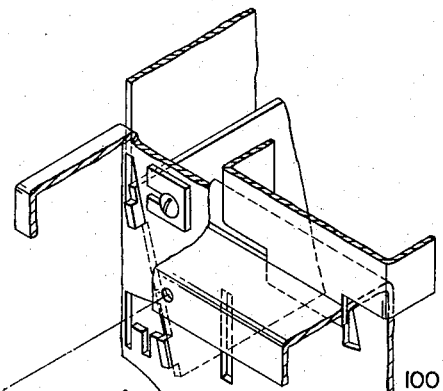

Jan. 9, 1968 F. A. GASPARINI 3,362,582
VENDING MACHINE WITH SEPARATELY ACTING, SERIES, ARTICLE
RELEASERS
Filed April 28, 1965 12 Sheets-Sheet 8
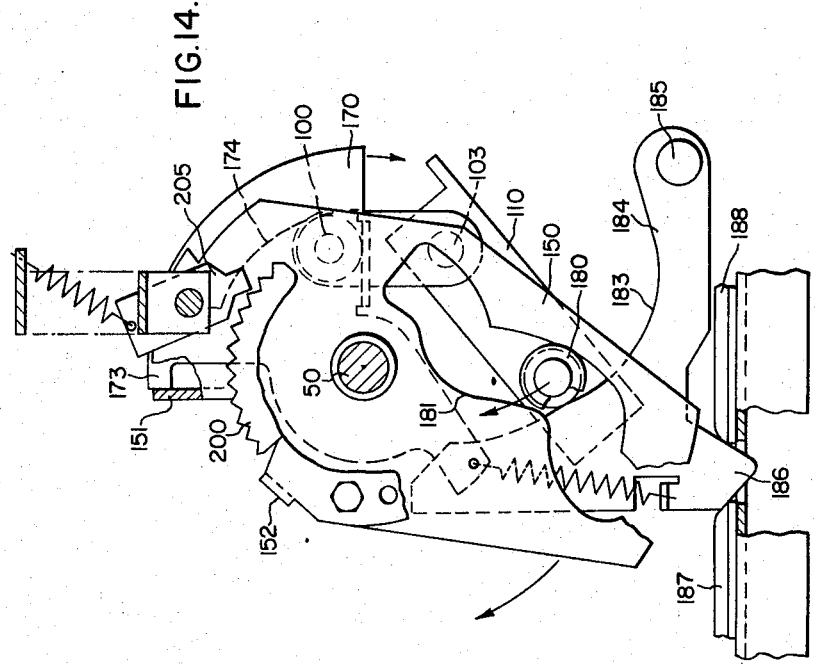
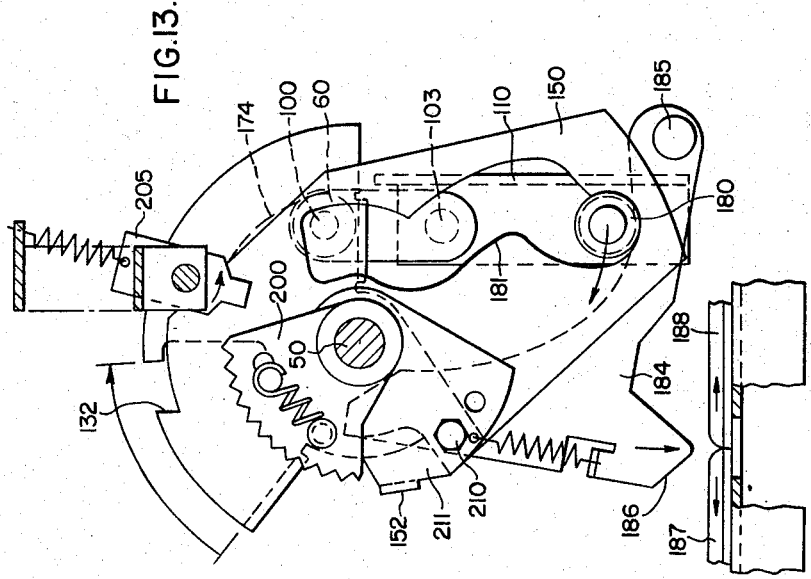

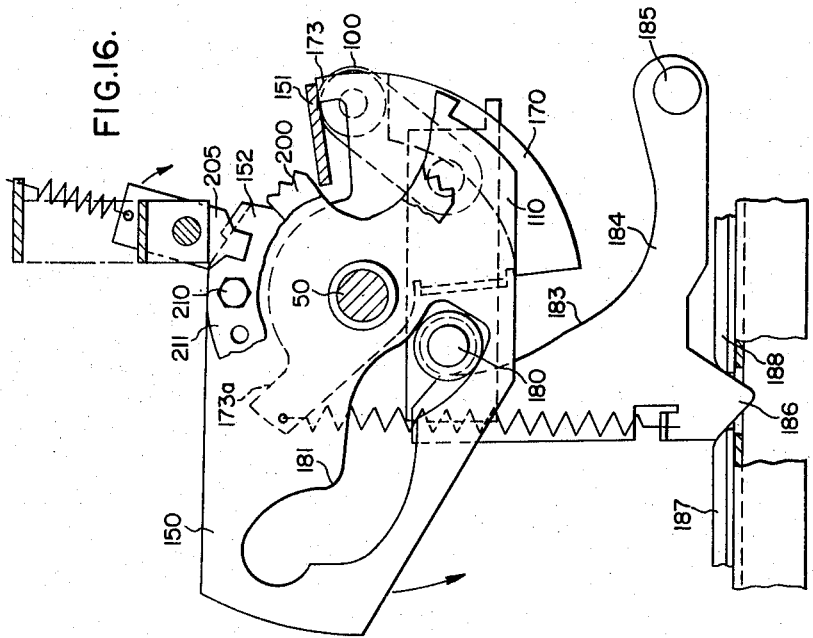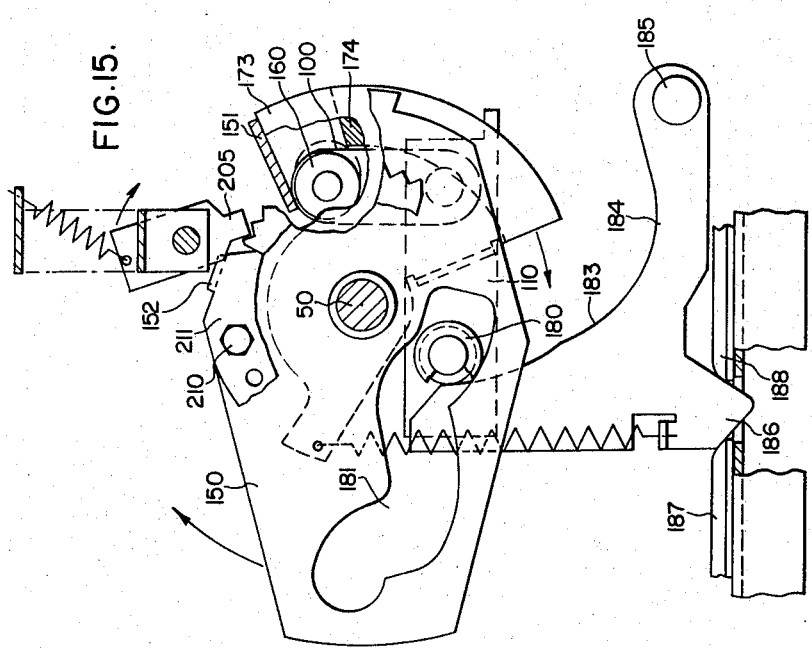

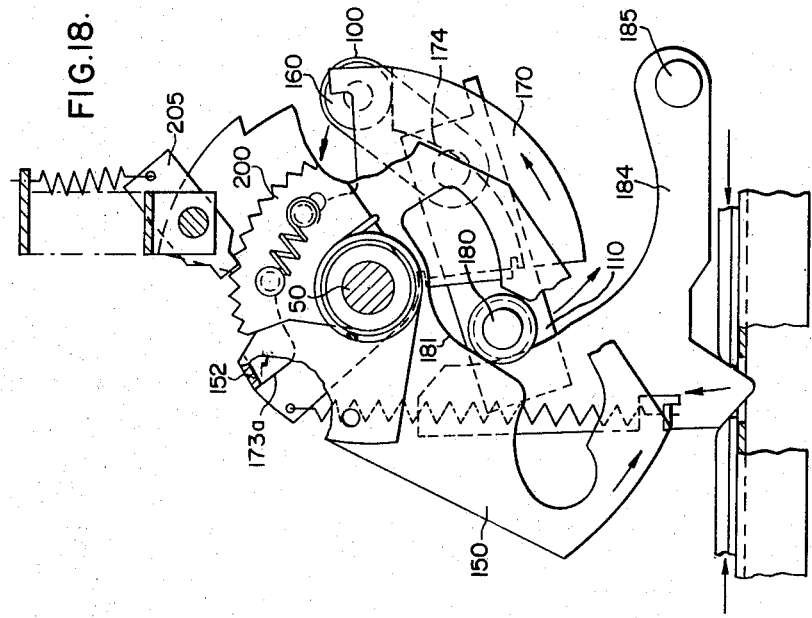
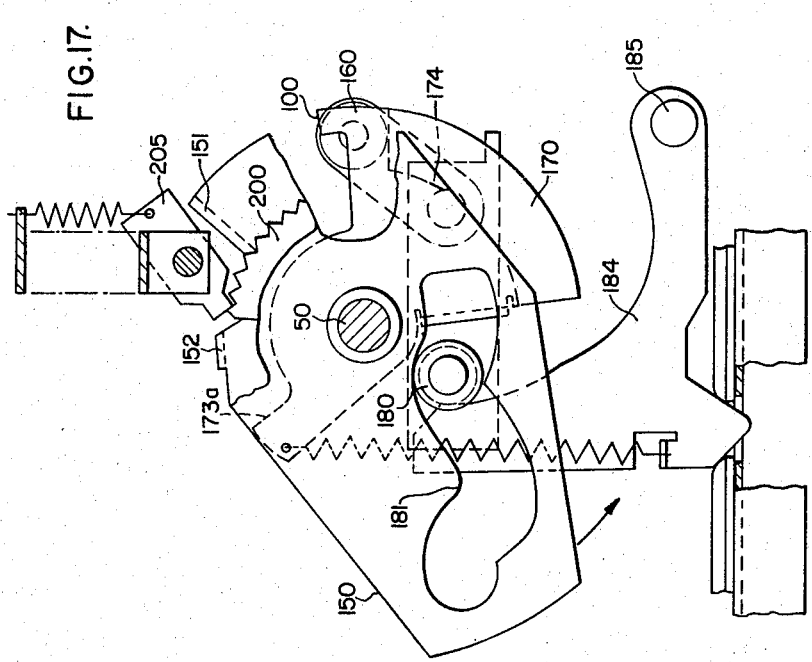

Jan. 9, 1968   F. A. GASPARINI   3,362,582
VENDING MACHINE WITH SEPARATELY ACTING, SERIES, ARTICLE
RELEASERS
Filed April 28, 1965   12 Sheets-Sheet 11

United States Patent Office 3,362,582
Patented Jan. 9, 1968

3,362,582
VENDING MACHINE WITH SEPARATELY ACTING, SERIES, ARTICLE RELEASERS
Francis A. Gasparini, Longmeadow, Mass., assignor to Westinghouse Electric Corporation, Pittsburgh, Pa., a corporation of Pennsylvania
Filed Apr. 28, 1965, Ser. No. 451,579
7 Claims. (Cl. 221—298)

ABSTRACT OF THE DISCLOSURE

A manually operated, multiple column, multiple choice, vending machine having a reciprocable customer operated lever for a vending gate for each column to operate an article release rod and an article receiving vend plate in timed relation to each other in a predetermined sequence to obtain smooth and relatively effortless vending.

---

The present invention relates to vending machines and more particularly to an improved vending mechanism which may be adapted to a vending machine having a plurality of substantially vertical side by side storage columns and adapted to vend bottled or canned articles or the like.

Vending machines for articles such as bottled or canned cold drinks are well known. It is of course desirable that the machines be attractive and also easy to operate by the consumer. It is also most desirable that the machines be as uncomplicated and as reliable as possible while at the same time being compact and easy to service. It should be obvious that a manually operated machine, i.e., a machine in which the vending is powered by the customer when operating the machine, is the least complicated and most economical to build and service, since it does not require electric motors, and requires a minimum number of solenoids, relays or the like for its operation as does the so-called automatic vending machine. However, prior to this invention, the manually operable bottle vending machines have not been relatively as attractive and popular with the customer as the automatic machine, because they have been more difficult to operate, requiring more physical exertion, and were otherwise unattractive in appearance to the customer. It is believed that many of the article locking and unlocking vending arrangements for manual machines as they were known prior to this invention, were inherently hard working and subject to difficulties such as jamming which caused much customer complaint.

It is a principal object of the present invention to provide a vending machine with an improved manually operable article release mechanism that is simple in construction, reliable and easy working in operation, and that will be attractive to the customer.

Yet another object of the present invention is to provide a vertical column article vending machine with an improved manually operable article locking and release mechanism that, with the exception of the coin changer and latch mechanism, does not employ any electric motors, solenoids or relays, and is entirely mechanical in its operation thus resulting in a low cost, reliable and easy to service machine.

A still further object of the invention is to provide an improved manually operated vending machine of the multiple column type having easy working mechanisms to enable a customer to select and vend any one of a plurality of different articles after the machine has been unlocked such as when the required coins are deposited, thereby providing a so-called post select operation with an arrangement that is effective to prevent the selection of more than one different article and the vending of more than one of the selected articles at the same time.

In acordance with the invention, a magazine structure having a plurality of substantially vertical side by side positioned columns for stored articles such as bottles or cans, is provided with a respective manually operable article releasing and vending mechanism at the lower end of each column. The arrangement is such that when the mechanism is operated, a column of articles, including the article to be vended, will be moved to release and drop by gravity a single one of the articles to the vending opening of the machine cabinet. More particularly, the vending mechanism of the invention comprises an article support and release or locking member pivotally mounted at a point to one side of and beneath each respective column of articles and arranged to have a normal position beneath and in engagement with the lowermost one of the articles in the column of articles to be vended to thereby support and lock the articles but movable to an operated position out of engagement with the lowermost article to enable the column of articles with the lowermost article to move past it for vending purposes. In addition a vend plate, also pivotally mounted at a point to one side and beneath each respective column of articles, is adapted to have a normal position out of contact with articles to be vended but movable to an operated position beneath the lowermost article in the column as the aforementioned locking member is moved to its operated position to thereby permit the column of articles to move by gravity past the locking member towards the vending opening with the lowermost article and the column of articles supported on the vend plate in the operated position. In accordance with the invention, a respective operating means for each column is arranged to be manually operated to move the respective locking means and vend plate in timed relation to each other such that the locking means is moved to the operated position after the vend plate is moved to the operated position and thereafter the locking means is moved back to its normal position over the lowermost article supported on the vend plate and beneath and in supporting and locking relation to the remainder of the articles in the column as the vend plate continues to be moved back to its normal position to permit passage and vending of the lowermost article in the column previously supported on the vend plate during the vending operation. An important feature of this invention is the provision of adjusting means for each operating means for adjustably predetermining the timed relation for moving the locking means from the operated position back to its normal position before the vend plate is fully moved back to its normal position to vend the article. The adjustably predetermined time at which the locking means is moved back under the articles above the lowermost article supported on the vend plate must be related to the position of the vend plate in its movement back to the normal position in direct relation to the width of the article being vended in order to obtain a smooth acting separation of the lowermost article to be vended from the remainder of the articles stored in the column. In addition, suitable interlock means is provided to prevent the concurrent operation of more than one of the operating means so that simultaneous selection and vending of an article from more than one column of articles is prevented.

It is another important feature of the invention that each of the aforementioned operating means is effective to positively move both the locking means and the vend plate from their normal positions to their operated positions and back to their normal positions in the aforementioned timed relation without depending upon the weight of the articles for any of such movements. Thus a smoothly operated vending mechanism is provided that may easily be manually operated without a possibility of jamming. Also, the positive movement of the locking means by the operating mechanism of the invention is effective to assure the prevention of the vending of more than one article in the column of articles.

In a particular preferred embodiment of the invention as adapted to vend articles such as cylindrical cans or necked bottles, adjusting means in the form of a pivotally or adjustably secured adjusting plate member is provided at the lower end of each column structure to one side thereof adjacent and opposite to the normal position of the locking member to thereby adjustably predetermine the outlet width of each column to correspond to the width of the article and thus assure the proper operation of the article locking and release member. In addition, when particularly adapted to vend necked bottles, the invention provides for a bottle neck guide to be positioned along the length of the column structure to approximately center the necks of the bottles contained within the column and another feature of the vending machine of the invention is the provision of novel deflection means on the lower end of each neck guide to thereby deflect the neck end of the bottle away from the center line of the column towards the side of the column adjacent which is supported the locking member to thereby prevent undesirable flexing of the adjusting plate member and the column structure as the bottle to be vended is moved past the locking member and adjusting plate onto the vend plate member.

Further objects, features and the attendant advantages of the invention will be apparent with reference to the following specification and drawings in which:

FIG. 2 is a perspective front elevational view of the vending mechanism magazine structure of the invention;

FIG. 3 is a fragmentary view of the lower portion of one of the columns of the vending magazine with some parts shown partly in section and other parts broken away for clarity;

FIG. 4 is a section on the line IV—IV of FIG. 3 with the locking member and the vend plate shown in their normal positions;

FIG. 5 is a view similar to FIG. 4 but showing the vend plate in the operated position and the locking bar in the normal locking position;

FIG. 9 is an exploded perspective view of one of the vending release operating mechanisms together with a fragmentary portion of the magazine structure associated therewith;

FIG. 10 is a detailed view of the locking bar cam member;

FIG. 11 is an end view of a vend plate cam member;

FIG. 12 is a view similar to FIG. 11 but showing a different form of the vend plate cam member;

FIG. 13 is a fragmentary elevational view partly in section of the vending operating means of the invention with the parts in the normal position;

FIG. 14 is a view similar to FIG. 13 but showing the operating means with the parts in the position assumed as the operating means is first moved from the normal position with the vend plate partly raised;

FIG. 15 is a view similar to FIG. 14 but showing the parts in the position where the vend plate is in the operated position and fully raised and the locking bar is about to be moved to the operated position and released;

FIG. 16 is a view similar to FIG. 15 but showing the parts in the fully operated position with both the vend plate raised and the locking member released;

FIG. 17 is a view similar to FIG. 16 but showing the parts of the operating mechanism in the position assumed as the operating mechanism is beginning to be returned from the operated position to the normal position;

FIG. 18 is a view similar to FIG. 17 but showing the parts in the positions assumed as the vend plate begins to move downward and the locking bar is starting to move inward back to its normal locking position over an article to be vended and beneath the remainder of the articles in the column;

FIG. 19 is a view similar to FIG. 18 but showing the parts of the operating mechanism in the position assumed after the locking member has moved back to the normal locking position and as the vend plate is also moved back to the normal position to release the article to be vended;

Figure 1:
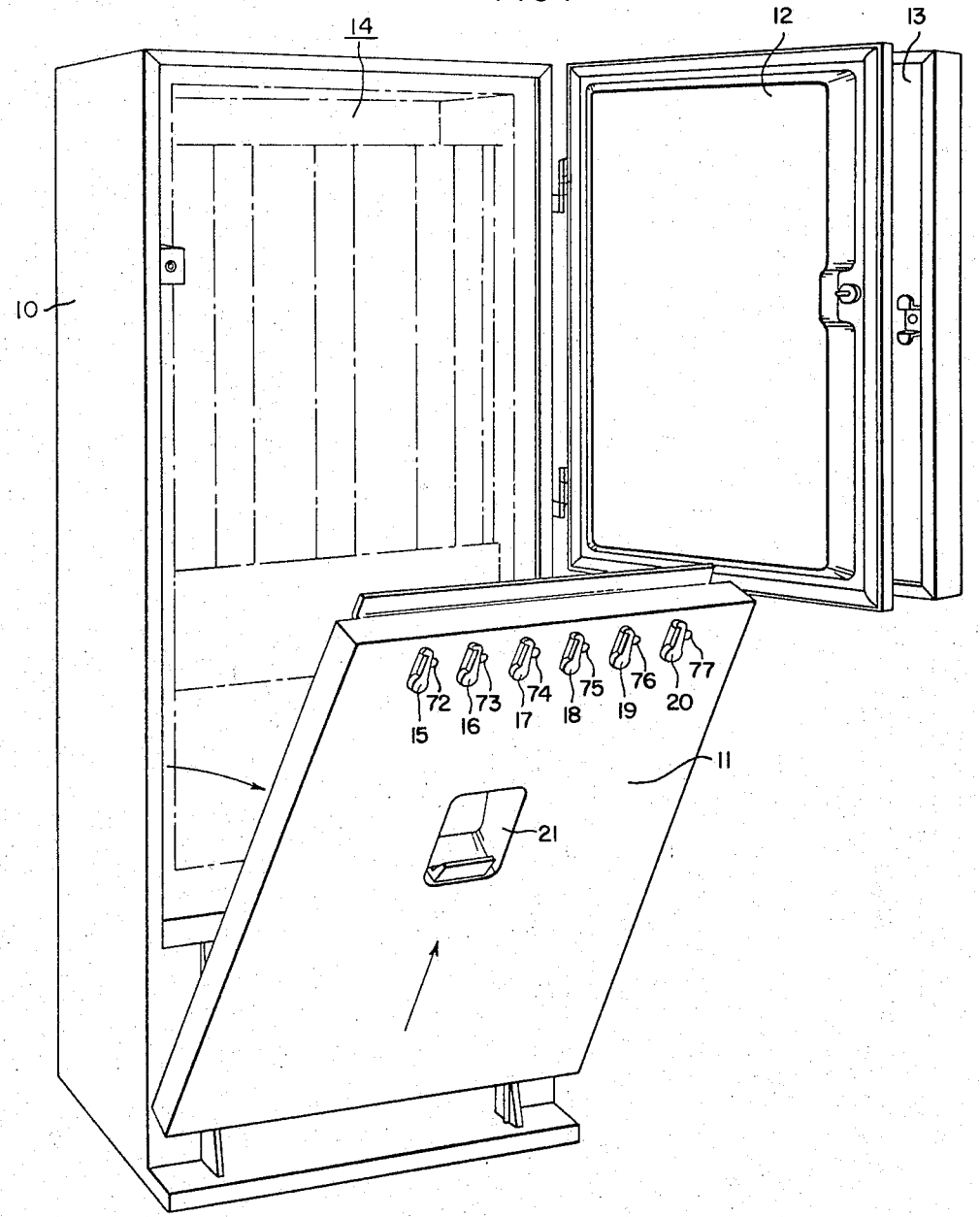
FIGURE 1 is a front elevational perspective view of a vending machine cabinet that may embody the vending mechanism of the invention.
Figure 6:
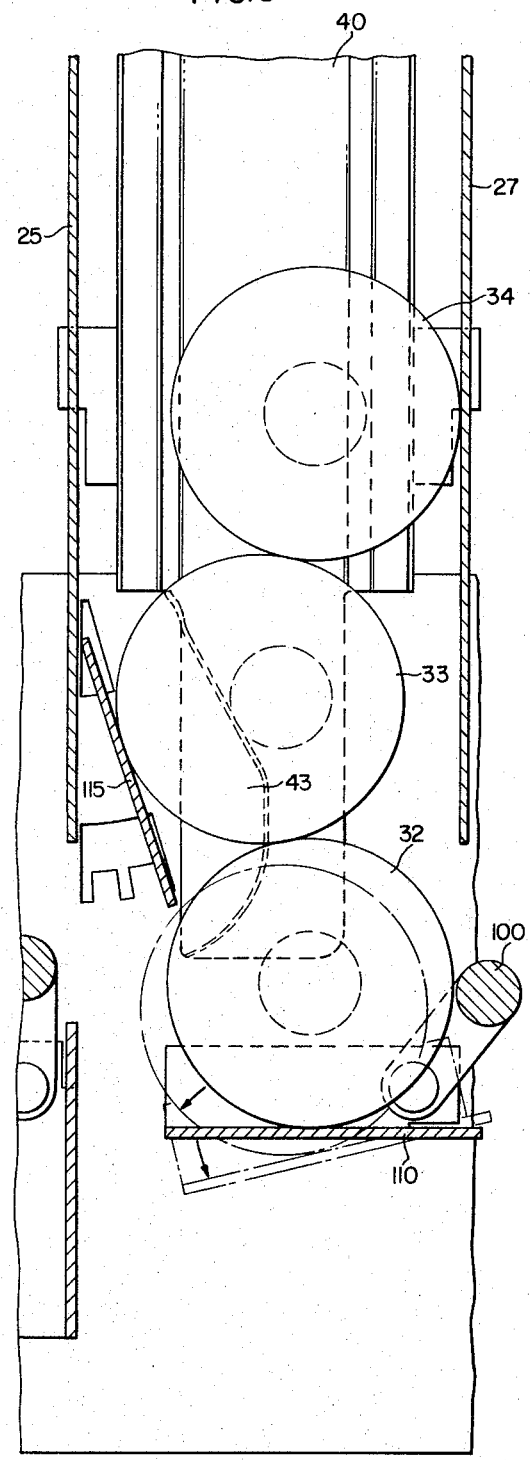
FIG. 6 is a view similar to FIGS. 4 and 5 but showing both the vend plate and the locking member in their operated positions.

Referring to FIG. 1 of the drawings an example of a suitable vending machine cabinet 10 adapted to contain the vending mechanism of the invention is shown to comprise a lower horizontally hinged door 11 and upper side hinged doors 12 and 13.

No details of the cabinet structure are described herein since they are not a part of the present invention, but if more description is desired, reference may be made to the co-pending patent application of Iber C. Courson, Ser. No. 451,577, now Patent 3,287,079, filed the same day as the subject application and assigned to the same assignee as the subject application. The vending mechanism or magazine is generally shown at 14 to be mounted in the upper part of the cabinet 10. The article release mechanisms of the invention are mounted on the lower portions of the magazine 14 and are adapted to be operated by individual ones of the manually operable vending handles 15–20. The article release mechanisms of the invention are such that each may be individually operated upon manual rotary reciprocation of a selected one of the handles 15–20 first in the clockwise direction and then in the counterclockwise direction to enable the selection and vending of an article from a particular one of the six vertical side by side columns of articles in the magazine 14. Although the invention will be described in connection with a six column post-select machine it should be understood that the invention is not limited to a particular number of columns of articles and the vending release mechanism may even be used in a single column vending machine in which case the interlock mechanisms to be described would not be required. Also although the vending machine of the invention to be described is particularly intended to be a coin controlled machine, it should be understood that the features of the invention are not limited to a coin controlled machine. The arrangements of the invention for the multiple column vending machine to be described in detail herein are such that interlock mechanisms are required to prevent the concurrent operation of more than one of the vending handles 15-20 to deliver more than one selection of article to the article delivery opening 21 for each coin controlled release.

Referring now to FIG. 2 of the drawings the vending mechanism magazine 14 will be described in greater detail. The magazine is comprised of the spaced apart end wall partitions 25 and 26 that are vertically mounted together with the vertically mounted parallel spaced inner walls or partitions 27-31 that divide the magazine structure into a series of six substantially vertical side by side columns adapted to contain bottles or cans or other cylindrical articles to be vended such as the bottles 32-35 shown in the left hand column of the magazine. Slidable access and retainer members 36-38 are provided along the front surface of the magazine to retain the articles in the six vertical column structures. The retainer elements 36-38 do not form a part of the present invention and their details are therefore not shown. It will be understood any suitable arrangement for slidably positioning the retainer members 36-38 may be employed, it being required that when a column is to be loaded with articles to be vended, the appropriate one of the retaining members 36-38 is moved to one side or the other to obtain access to the column for loading purposes. Retaining members for the rear of the articles in the column such as the member 40 are adjustably positioned in suitable slotted surfaces of the end walls and inner partitions such as shown at 41 and 42 on the end wall 25. When the vending machine of the invention is particularly arranged to dispense necked bottles, the rear retaining member such as the member 40 will comprise a neck guide element which is more clearly shown in FIGS. 3-7 of the drawings and will later be described in more detail.

Still referring to FIG. 2 of the drawings the lower end of the magazine 14 contains the article release mechanisms for each of the respective columns of articles to be vended and each such mechanism includes a respective rotatable shaft 50-55 adapted to be connected by the respective link levers 56-61 to respective ones of the operating handles 15-20 of the vending machine cabinet. Each of the vertical columns in the magazine 14 is also provided with a respective article sensing empty signal lever such as generally shown at 65-70 and since only the left hand column has been illustrated to contain articles to be vended such as the bottles 32-35, only the empty signal lever 65 is shown in the position assumed when an article to be vended is sensed as being contained in the column. The other empty sensing and indicating levers 66-70 are shown in the positions assumed when their respective columns are empty. A common horizontal interlock bar 71 is shown in the position as supported by any one of the empty levers 65-70 so long as there is an article to be vended in any one of the columns of the machine. When all of the columns are empty and all of the empty sensing levers including the lever 65 have moved to the position as shown for the empty lever 66-70, then the horizontally positioned all-empty bar 71 will drop downward to signal a sold-out condition for the entire machine. Suitable individual column empty indicators such as the plungers 72-77 shown by FIG. 1 of the drawings may be operated to be moved out of the lower door panel 11 when an associated respective one of the empty signal operating levers 65-70 moves to the empty signaling position such as shown by any one of the empty levers 66-70. The empty signaling arrangements just described are not a part of the present invention but are described in more detail and claimed in the copending applications of Wallace R. Lyman, Ser. No. 451,576, now Patent 3,270,916, filed Apr. 28, 1965, and Robert R. Hamel, Ser. No. 451,580, filed Apr. 28, 1965, both of which are assigned to the same assignee as the subject patent application.

Reference will now be made to FIGS. 3-7 of the drawings for a more detailed description of the vending release mechanisms at the lower end of each of the columns of articles to be vended. It should be understood that the vending release mechanisms to be described are substantially identical for each column of articles and therefore only a single such vending mechanism will be described at this time in connection with FIGS. 3-7 of the drawings. The mechanism will now be described in connection with the vending of a cylindrical article such as a bottled cold drink 32. As previously described the left-hand column of the vending machine containing bottles 32-35 to be vended is formed by the end wall 25 and the parallel spaced partition wall 27 together with a front retaining member 36 and a rear bottle neck guide member 40. The lowermost bottle 32 to be vended in the column of bottles including the bottles 33 and 34 shown by FIGS. 4 through 7 of the drawings and bottle 35 shown by FIG. 2 of the drawings is adapted to be supported and locked in the machine by the article or bottle locking bar member 100 which is secured to forward and rearward links 101 and 102 which are pivoted to the magazine structure at 103 and 104 respectively, to one side of and beneath the column of bottles. FIGS. 3, 4 and 5 of the drawings show the article support locking bar or rod 100 to be in the normal position for supporting and preventing passage of the lowermost bottle 32 in the column of bottles to be vended. The vend plate 110 is also pivotally secured to one side of and beneath the column structure for the column of articles to be vended and is arranged to have a normal position as shown by FIGS. 3 and 4 of the drawings and an operated position as shown by FIG. 5 of the drawings. Since both the vend plate 110 and the article support or locking bar 100 are pivotally secured to one side of and beneath the row of articles to be vended it is possible, in the preferred arrangement of the invention, to have the vend plate 110 pivoted about the same pivot points 103 and 104 as the locking bar member 100. It will be seen by FIGS. 3 and 4 of the drawings that the normal position for the vend plate 110 is such as to permit passage of the article to be vended thereby onto the vending chute below (not shown) for delivery to the vending opening 21.

The spacing of the end walls 25, 26 and the parallel spaced partitions 27-31 is such as to provide individual columns for storage of articles to be vended having a width slightly greater than the maximum width of cylindrical article, bottle or can, to be accommodated and vended. It is therefore desirable to provide a pivotally secured adjusting plate 115 to one side of the lower end of each column opposite to the article locking and release bar 100 to thus narrow the outlet width of the article storage column appropriate to the desired diameter of cylindrical article to be stored and vended in a particular column. As shown by the dotted lines in FIG. 4 of the drawings, the vend plate 115 may assume several other positions to accommodate other sizes of cylindrical articles also shown by the dotted lines. The solid line position of the vend plate 115 is the position assumed for the smallest diameter of cylindrical article or bottle to be vended.

Referring to the bottle neck guide 40 as may be used to approximately center the necks of the bottles stored in the vertical storage column, it will be seen that the neck guide 40 may assume various positions from front to back to accommodate different lengths of cylindrical bottles to be vended. As shown by FIG. 3 of the drawings, the neck guide 40 is shown to be supported within a slot 41 of the end wall 25 at an intermediate position for an intermediate length of bottle. It will be understood that each of the partitions such as the internal partition 27 is provided with similar slotted arrangements to adjustably position and support the respective bottle neck guide such as the guide 40 between partition walls defining each storage column of the vending magazine. A feature of the invention is the provision of a deflecting cam surface 43 on the bottle neck guide formed by bending inward a sidewall at the lower end of the bottle neck guide 40. As is clearly shown by FIGS. 4 through 7 of the drawings, the deflecting cam surface 43 of the bottle neck guide 40 serves to deflect the neck of a bottle being vended away from the approximate center line of the column towards the column wall adjacent the article support and locking member 100. This camming action upon the neck of the bottle by the lower end of the bottle neck guide 40 serves to deflect the axis of the bottle to a slightly non-parallel axis relative to the plane of the bottle adjusting plate 115 and the sidewalls 25 and 27 of the column as the bottle is being vended. It has been found that such deflection of the bottle being vended is desirable to provide a smoother action of the article release mechanism to be later described and to minimize undesirable deflections of the lower ends of the column partition walls and the bottle adjusting plate 115 while the bottle is being vended.

Assume that the bottle 32 is to be vended and that therefore the bottle sensing empty signal lever 65 that is pivoted at 130 is held in the upper position shown with the heel of the bottle 32 resting against the lever arm 131, upon unlocking the vending mechanism such as upon the deposit of the required coins in a manner to be later described in more detail, the operating shaft 50 may be rotated and reciprocated first clockwise and then counterclockwise in order to operate the release mechanism of the invention. If the column containing the bottle 32 had been empty, then the empty lever 65 would be in the lower position such as shown for the lever 66 in FIG. 2 of the drawings and a mechanical interlock to prevent the rotary reciprocation of the vend shaft 50 would be obtained. For a more detailed understanding of the mechanical interlock, reference is made to FIGS. 8 and 9 of the drawings wherein an empty lever 66 is shown in the raised position to indicate the presence of articles to be vended. If the empty lever 66 were moved to the lower position due to a lack of articles to be vended in the column, then the lever 66 would engage the surface 132 of the vending plate cam 150C that is secured to the shaft 51 to prevent clockwise rotation of the vending shaft 51 away from the normal locked position.

Figure 7:
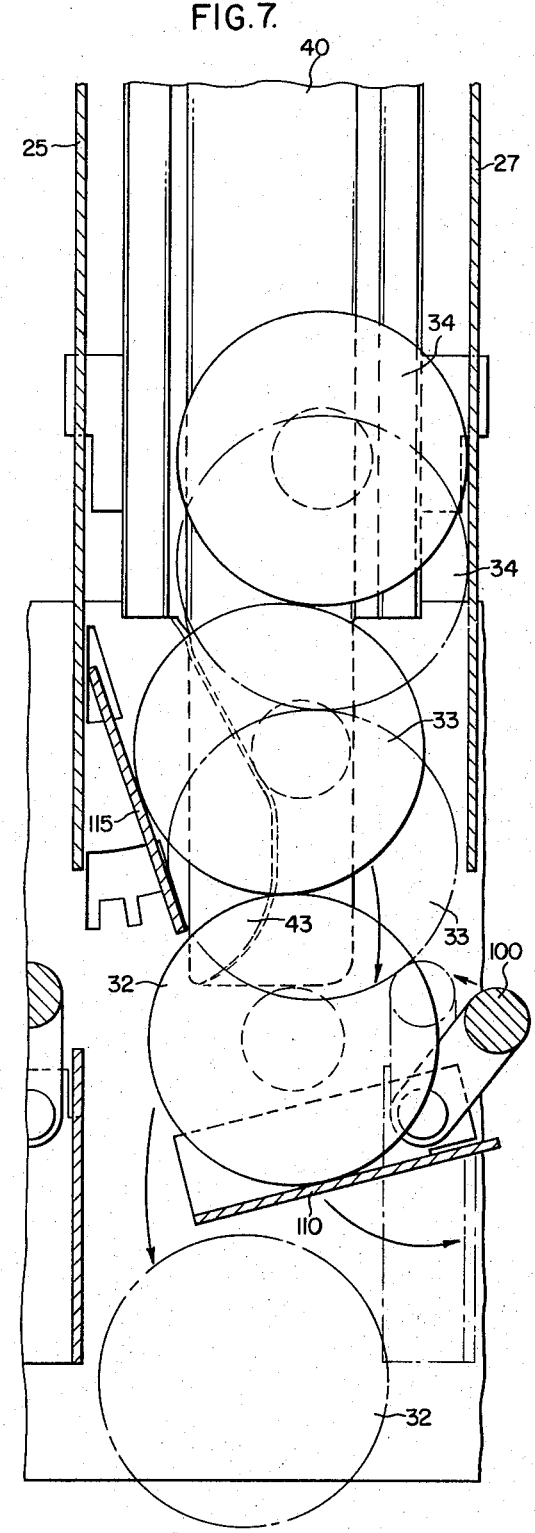
FIG. 7 is a view similar to FIG. 6 but showing the vend plate in the position as it is moved back from the operated position to the normal position and just prior to moving the locking bar member back from its operated position to its normal locking position.

Again referring to FIGS. 3–7 of the drawings, and assuming that the bottle 32 is present for vending and the machine has been unlocked upon deposit of the required coinage, rotary movement of the vend shaft 50 in the first clockwise direction will first move the vend plate 110 from the solid line position shown in FIG. 4 of the drawings to the dotted line position shown by FIG. 4 and the solid line position shown by FIG. 5 of the drawings. Continued rotation of the vend shaft 50 in the clockwise direction will thereafter move the article supporting lock bar 100 from the solid line posiiton of FIG. 4 of the drawings to the dotted line position of FIG. 5 and the solid line position of FIGS. 6 and 7 of the drawings thus enabling the bottle 32 to move past the end of the adjusting plate 115 to the dotted line position of FIG. 5 of the drawings and the solid line position of FIG. 6 of the drawings to be supported on the vend plate 110 then in its operated position. After the vend shaft 50 has been moved to the full limit of its travel in the clockwise direction and has caused the vend plate 110 and the locking or support bar 100 to assume the operated positions shown by FIG. 6 of the drawing, a full travel ratchet mechanism to be later described in more detail will enable the vend shaft 50 to be reciprocated and rotated backward in the counterclockwise direction to its normal locking position. As the vend shaft 50 is begun to be moved backward in the counterclockwise direction the vend plate 110 starts to return downward to its normal position as shown by FIG. 7 of the drawings and the locking member or support bar 100 is moved backwards towards its normal position. The timing of the movement of the vend plate 110 downward back to its normal position and the operating bar 100 inward back to its normal position in relation to each other is important and is predetermined in accordance with the size of the article to be vended to assure that the locking bar 100 will be brought in between the lowermost article then supported on the vend plate 110 and the remainder of the articles in the column to be vended. The details of the mechanism for adjustably predetermining the timed movement of the vend plate 110 and the locking bar 100 back to their normal positions will be later described in more detail in connection with other figures of the drawings but it will be understood that the timing is such that the lock bar 100 is positively moved to intercept the remainder of the articles in the column above the article to be vended on the vend plate and thereby prevent the vending of more than one article at one time from a single column of stored articles. As the vend shaft 50 is returned to its fully counterclockwise or normal position the vend plate 110 moves to the dotted line positions of FIG. 7 of the drawings thus allowing the bottle supported thereon to be vended to move by gravity to the dotted line position shown and from there onto the vending chute (not shown) for delivery to the vending machine outlet 21.

Figure 8:
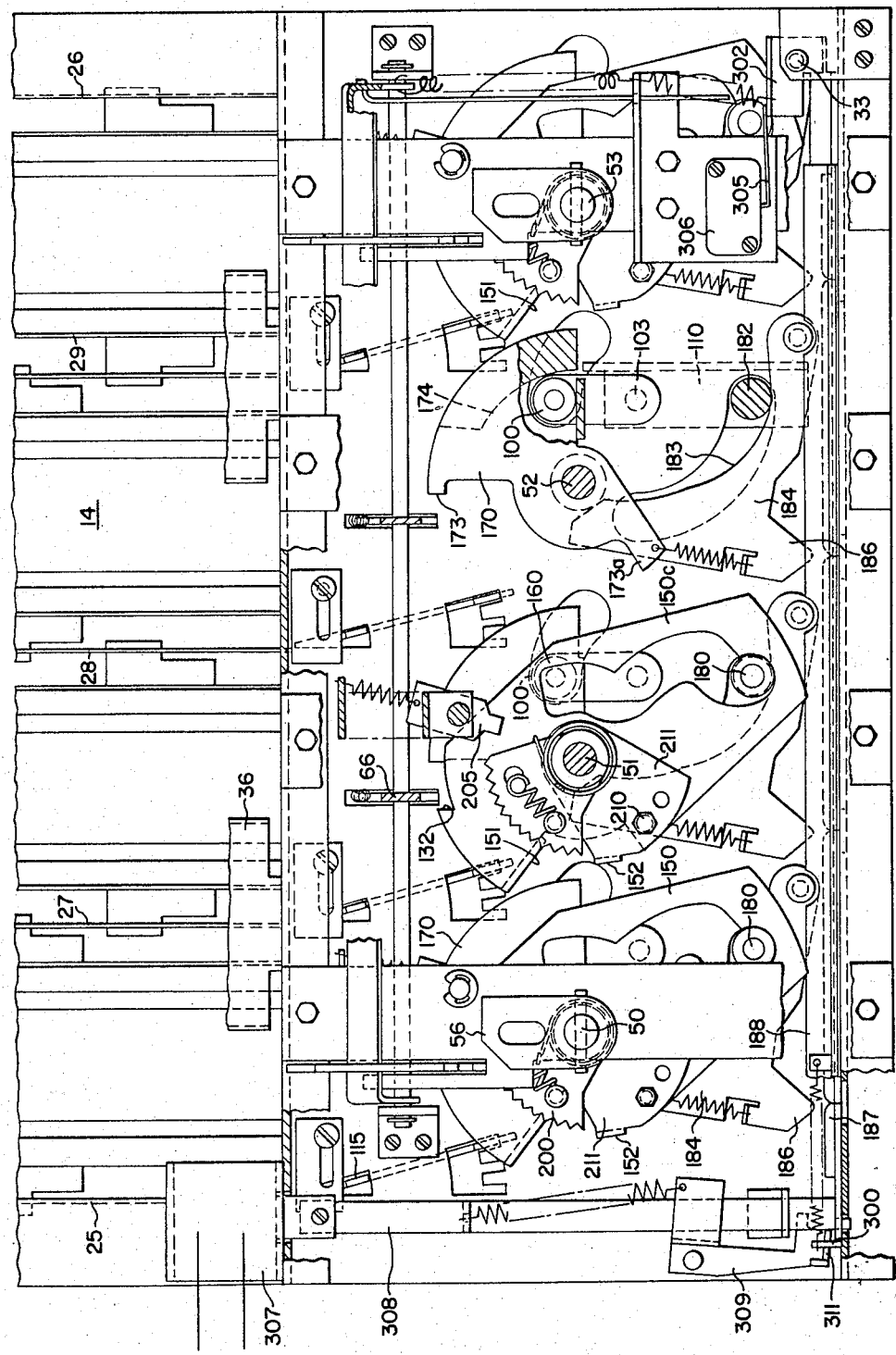
FIG. 8 is a fragmentary front elevational view of the lower end of the magazine with various parts broken away and other parts shown in section to illustrate the details of the respective operating means for each of the respective columns of the vending magazine.

Referring now to FIG. 8 of the drawings, a more detailed description of the respective vending release mechanisms and operating means for each of the side by side columns of stored articles will be described. FIG. 8 of the drawings, for the sake of size and clarity of the drawings, has been modified to show only four columns of articles to be vended it being understood that any number of columns such as the six columns shown by FIG. 2 of the drawings may be provided. Each of the columns of stored articles is provided with operating means for the vending release mechanisms including the rotatable vend shafts 50, 51, 52, and 53. In order to enable the vending machine and cabinet to be as compact as possible and place the side by side storage columns as close together as possible, adjacent vend plate cams 150 and 150C take alternate forms as shown by FIGS. 11 and 12 of the drawings so that when a particular vend plate cam such as the cam plate 150C is rotated by clockwise rotation of the vend shaft 51, such cam plate 150C will move behind the normal position of the adjacent cam plate 150 on its left. Similarly the cam plate for the vend shaft 52 that is next on the right of the cam plate 150C would have a form similar to that of cam plate 150 (FIG. 11 of the drawings) to move into a position in front of the cam plate 150C when the shaft 52 is moved in the clockwise direction for vending. Except for the aforementioned differences in the vend plate cams 150 and 150C (FIGS. 11 and 12 of the drawings) the individual operating means for each of the side by side positioned columns of articles to be vended are identical and like reference numerals will be used on all similar parts of the operating mechanisms as shown to be described in connection with FIG. 8 of the drawings.

Reference may also be made to FIGS. 9 and 10 of the drawings which show in detail some of the various elements of each of the operating mechanisms connected to a respective one of the rotary reciprocating vend shafts 50–53. The article locking or support bar 100 is provided with a cam roller 160 that is arranged to be moved by the locking bar cam member 170, shown by FIG. 10 of the drawings from the normal position as shown in supporting relation for the column of bottles, to the dotted line position such as shown by FIG. 5 of the drawings in the direction of the arrow of FIG. 9 of the drawings. The vend plate 110 is similarly provided with a cam roller 180 adapted to be received in the cam slot 181 of the cam plate member 150 which is fixed to the operating or vend shaft 50. The rotation of the vend shaft 50 in the clockwise direction guides the cam roller 180 in the cam slot 181 of the cam plate 150 to move the vend plate 110 from the solid line position shown by FIG. 9 of the drawings to the solid line position shown by FIG. 5 of the drawings. It should be pointed out that the operating cam plate 170 for the locking bar 100 is freely rotatable at 171 on the extension 172 of the vend shaft 50 and is only caused to move in the clockwise direction or the direction of the arrow shown by FIG. 9 when the cam plate 150 has been rotated sufficiently in the clockwise direction to bring the vend plate cam bent tab projection 151 into engagement with the end surface 173 of the locking bar operating cam member 170.

As the vend plate 110 is moved upward in the direction of the arrows from the normal position shown by FIG. 9 to the operated position shown by FIG. 5 of the drawings, the pin or shaft 182 upon which is supported the cam roller 180 rides against the cam surface 183 of the interlock slide operating lever 184 that is pivoted at 185 to move the interlock lever 184 counterclockwise and downward in the direction of the arrow. The pointed end 186 of the interlock slide operating lever 184 penetrates between two adjacent interlock slide members such as shown at 187 and 188 which, assuming they are free to move in the directions of the arrows, are thereby separated to allow for a slight continued movement of the interlock lever 184 to a position to permit the further movement of the vend plate roller 180 and vend plate 110. If the machine has not been unlocked by the deposit of the required coinage, the coin trip or latch mechanism to be later described in detail, will prevent the movement of the interlock slides 187 and 188 in the direction of the arrows and continued or further rotation of the vend shaft 50 to move the vend plate 110 from its normal position will be prevented by the wedging action of the cam surface 183 of the interlock member 184 against the pin 182 of the vend plate 110. The movement of the interlock slides from their normal positions by operation of a vending release mechanism such as the mechanism just described in connection with the rotation of shaft 50 is effective to prevent concurrent operation of any other vending release mechanism since the operated positions of the slides are then such that the pointed end of any other interlock slide operating lever similar to the lever 184 would have insufficient space in which to enter between the interlock slides. Thus, the rotation of other respective vend shafts is prevented while a particular vend shaft such as the vend shaft 50 is being rotated.

A full travel ratchet sector 200 is connected for rotation with the shaft 50 and cam plate 150 by means of a coil spring 201 interconnecting the pin 202 on the ratchet sector 200 and the pin 203 carried by the cam plate 150 extending through the slotted opening 204 of the ratchet sector 200. A ratchet pawl member 205 is pivoted at 206 and provided with a conventional overcenter connected spring 207 to engage the teeth of the full travel ratchet sector member 200 in a manner to require that, once the clockwise rotation of the vend shaft 50 is started, it must continue until the pawl 205 no longer engages the teeth of the ratchet sector at the end of the full travel of the vend shaft 50 in the clockwise direction. Thereafter the shaft 50 may be reciprocated and returned in the counterclockwise direction to pivot the ratchet pawl 205 in the opposite direction against the teeth of the full travel sector 200 to require that the vend shaft 50 continue to move thereafter only in the counterclockwise direction until it is fully returned to the normal locked position. The spring interconnection 201 between the full travel ratchet member 200 and the vend plate cam 150 is desirable to provide a small amount of flexibility for the mechanism when the parts are operated very rapidly by a customer who is attempting to, what may be described as "snap vend."

Particular attention is referred to the form of the lock bar release operating cam 170 as shown by FIG. 10 of the drawings. As previously mentioned the lock bar release operating cam 170 is freely rotatable about the extension 172 of the operating vend shaft 50. So long as the cam 170 remains in the solid line position shown by FIG. 9 of the drawings the cam roller 160 of the locking bar 100 will remain captured under the cam surface 174 as shown by FIG. 10 of the drawing. After the vend plate cam 150 and the vend shaft 50 have been rotated in a clockwise direction sufficient to bring the bent tab projection 151 of the vend plate cam 150 into engagement with the projection 173 of the lock bar release cam 170, the bar release cam 170 will start to move in the direction of the arrow to move the cam surface 174 out of engagement with the roller 160. At this time the weight of the bottles to be vended may start to pivot the lock bar 100 in the direction of the arrow out from under supporting and locking engagement with the lowermost bottle to be vended. If for some reason the weight of the articles in the stack is insufficient to start to move the locking bar 100 in the direction of the arrow of FIG. 9 of the drawings, then continued rotation of the vend shaft 50 will cause the bent tab projection 151 of the vend plate cam 150 to engage the cam roller 160 and positively move the locking bar 100 in the direction of the arrow to the unlocked position as shown by the solid lines of FIG. 6 of the drawings.

Attention is now directed to the specific shape of the cam slot 181 of the vend plate operating cam member 150. It will be noted that the shape of the cam slot 181 is irregular to provide pauses in the movement of the vend plate from the normal position to the operated position as the vend shaft is moved in the clockwise direction to coincide with the timed movement of the locking bar 100 in a particular manner to be later described more completely in connection with FIGS. 13–19 of the drawings. Also it should be pointed out at this time that the freely rotatably mounted locking bar operating cam 170 is arranged to have a first lost motion operation relative to the movement of the vend plate 110 in the clockwise direction and a second and different lost motion operation relative to the movement of the vend plate 110 in the counterclockwise direction. For example when the vend shaft 50 has been moved to the full extent of its travel in the clockwise direction and is then reciprocated to be returned back in the counterclockwise direction to its normal position, the vend plate cam 150 is first moved in the counterclockwise direction to begin to lower the vend plate 110 before the bent tab projection 152 of cam plate 150 engages the projection 173A of the locking bar operating cam 170, after which the cam 170 is positively moved in the counterclockwise direction to move the cam roller 160 to be captured underneath its cam surface 174 with the locking bar 100 moved back to the solid line locking position as shown by FIG. 9 of the drawings. Thereafter, continued motion of the vend shaft 50 in the counterclockwise direction to return all their parts to the normal position will move both the lock bar cam 170 and the vend plate cam 150 to thereby continue to move the vend plate 110 downwardly to discharge the bottle previously supported thereon while the locking bar 100 is positively held in the locking position with the roller 160 captured and riding under the cam surface 174.

Reference will now be made to FIGS. 13 through 19 of the drawings to describe in detail the sequence of operations and movements of the vend plate 110 and the locking bar 100 during a complete vending operation when a particular vending release mechanism is unlocked and reciprocated in first a clockwise direction and then counterclockwise direction. FIG. 13 of the drawings shows all of the parts of a vending release mechanism in the normal unoperated position and it is assumed that the required coinage has been deposited to unlock the machine to enable the interlock slides including the slides 187 and 188 to move in the direction of the arrows to allow counterclockwise movement of the pointed end 186 of the interlock operating lever 184 in the direction of the arrows when the vending operation is started. The cam plate 150 is shown to be in the normal rest position with the roller 180 of the vend plate 110 at the lower end of the cam groove 181. The full travel ratchet pawl 205 is shown to be in the normal position ready to engage the teeth on the periphery of the full travel ratchet sector 200. The locking bar 100 is shown in the normal article locking and supporting position with its cam roller 160 captured beneath the cam surface 174 of the lock bar operating cam 170. It is assumed that articles to be vended such as a bottle are present in the associated article storage column and the empty sensing lever such as the lever 65 shown by FIG. 2 of the drawings is in a raised position not shown on FIG. 13 but out of engagement with the locking surface 132 of the vend plate operating cam 150. Thus, the vend plate cam 150 together with the vend shaft 50 may be rotated in the clockwise direction to the position shown by FIG. 14 of the drawings.

In the position shown by FIG. 14 of the drawings the vend plate 110 and its cam roller 180 within the cam slot 181 of the vend plate cam 150 has been moved to a partly raised and bottle intercepting position. At the same time the vend plate cam roller 180 has engaged the cam surface 183 of the pivoted interlock slide operating lever 184 to cause the pointed end 186 thereof to penetrate between the interlock slides 187 and 188 to move them in the opposite directions of the arrows of FIG. 13 to their operated positions shown by FIG. 14 of the drawings. Thus, all of the other interlock members associated with the other operating mechanisms for the other columns of the vending machine are moved to operated positions such as to intercept and prevent the movement between adjoining interlock slides of the associated interlock lever for that mechanism. Still referring to FIG. 14 of the drawings, the movements of the vend plate cam 150 and the vending shaft 50 as thus far described have brought the bent tab portion 151 into engagement with the end 173 of the lock bar cam 170 to begin to move the cam 170 in the clockwise direction of the arrow to the position shown by FIG. 15 of the drawings. Referring now more particularly to FIG. 15 of the drawings, continued clockwise motion of the vend shaft 50 and the vend cam 150 will cause continued motion in the clockwise direction for the lock bar release cam 170 so as to bring the roller 160 for the lock bar 100 out from beneath the cam surface 174 as shown. At this time, the cam roller 160 for the lock bar 100 which is now disengaged with the cam surface 174 is in a position to be moved by the bent tab projection 151 of the vend plate cam 150 to the unlocked position shown by FIG. 16 of the drawings.

It will be noted at this time that the vend plate 110 has now been moved to the fully operated position to receive the bottle to be released and lowered by gravity as the lock bar 100 is moved to the operated or released position shown by FIG. 16 of the drawings. The clockwise motion of the vend shaft 50 and the vend plate cam 150 together with the operating bar release cam 170 is now limited by the engagement of the vend plate cam roller 180 in the upper end of the cam slot 181. Also at this time as shown by FIG. 16 of the drawings the full travel ratchet pawl 205 is disengaged from the teeth of the full travel ratchet sector 200 to permit it to pivot in the direction of the arrow to the position shown for allowing the vend shaft 50 to now be reciprocated backward in the counterclockwise direction.

FIG. 17 of the drawings shows the vending release mechanism of the invention with its parts in the position shown as the vend shaft 50 has begun to be rotated backwards in the counterclockwise direction. The vend plate cam roller 180 has reached an intermediate position in the cam slot 181 and the locking bar cam roller 160 is still in the article release position. Continued counterclockwise movement of the vend plate cam 150 will cause the bent tab projection 152 to engage the projection surface 173A of the lock bar operating cam 170.

FIG. 18 shows the vending release mechanism parts in the position with the bent tab 152 engaging the projection surface 173A to move the locking bar operating cam 170 in the counterclockwise direction and positively move the cam roller 160 with the locking bar 100 in the counterclockwise direction of the arrow. It should be pointed out at this time, that the position of the bent tab projection 152 carried by the vend plate operating cam 150 may be variably predetermined by removing the bolt 210 (see FIG. 9 of the drawings) and repositioning the pivotal sector portion 211 of the vend plate cam 150 upon which is carried the bent tab projection 152. The adjustable sector portion for the bent tab 152 is also shown by FIGS. 15 and 16 of the drawings. By adjusting the position of the bent tab 152 carried by the vend plate operating cam 150, the timing of the counterclockwise movement of the operating bar cam member 170 in relation to the counterclockwise movement of the vend plate cam 150 is predetermined to cause the locking bar member 100 to be moved in over a bottle to be vended as supported on the vend plate 110 and beneath the remainder of the bottles to be vended at the proper time in the movement of the vend plate 110 of the counterclockwise direction to the normal vending release position. It should be understood that the diameter of the cylindrical article to be vended determines the desired relation for the angular position of the vend plate 110 as it is moved back to its normal vending position at which time it is required to move the article locking bar 100 back to its normal locking and supporting position over the article on the vend plate and beneath the remainder of the articles in the column.

FIG. 19 of the drawings shows the vending release mechanism with its parts in their positions assumed just before the vend shaft 50 and vend plate operating cam 150 are returned to their fully counterclockwise or normal position. It will be noted that for the remainder of the counterclockwise movement of the vend shaft 50 and the vend cam plate 150, the cam roller 160 for the locking bar 100 is maintained in the normal locking position captured under the cam surface 174 of the locking bar operating cam 170. Thus, it is assured that the remaining articles in the column are locked to prevent inadvertent dispensing of more than one article as the vend plate 110 moves to the normal released position. When the vend plate 110 has been returned to the fully released and normal position shown by FIG. 13 of the drawings the coil spring 220 causes the interlock slide operating lever 184 to raise out of engagement with the interlock slides 187 and 188 which thereupon move in the direction of the arrows shown by FIG. 19 of the drawings back to the position shown by FIG. 13 of the drawings.

Reference is now made to FIGS. 20 through 23 of the drawings to describe in somewhat greater detail the interlock mechanisms and the unlocking mechanisms for the vending machine.

Certain of the details of the unlocking and interlock controlling mechanisms are the invention of Robert A. Hamel and are described in more detail and claimed in copending patent application Ser. No. 451,580, filed Apr. 28, 1965, and assigned to the same assignee as the present application for patent. As previously mentioned a plurality of interlock slides such as the slides 187, 188, 288 and 289 are provided to cooperate with respective ones of the interlock levers associated with respective ones of the article release mechanisms for each column such as the interlock slide operating lever 184. The left-hand interlock slide 188 is provided with an upstanding end portion 300 to which is connected a coil spring 301 for normally urging the slide 188 and the rest of the abutting slides such as slides 189, 288 and 289 in the direction to the right of the drawing. A bell crank lever member 302 is pivoted at 303 at the extreme right end portion of the vending machine and is constrained by the spring 304 to move the upstanding end portion 289A of the right-hand interlock slide such as the slide 289 towards the left to the position shown by FIG. 21 of the drawings. When the bell crank lever member 302 is in the position shown by FIG. 21 of the drawings, a switch arm 305 is engaged to move the switch 306 to a predetermined position, which for example may be wired in a circuit (not shown) to allow the vending machine to accept coins. Upon depositing the required coinage to unlock the machine, the vend solenoid 307 (see FIG. 20 of the drawings) is momentarily energized to raise the trigger latch arm 308 in the direction of the arrow of FIG. 20 to move the latch arm 308 to the position shown by FIG. 22 of the drawings. The latch arm 308, when raised to the position shown by FIG. 22 of the drawings, is retained in that position by the pivoted latch member 309, it being noted that the lower end 310 of the latch bar 308 is received and supported on the surface 311 of the pivoted latch 309 as urged to that position by the coil spring 312.

Figure 21:
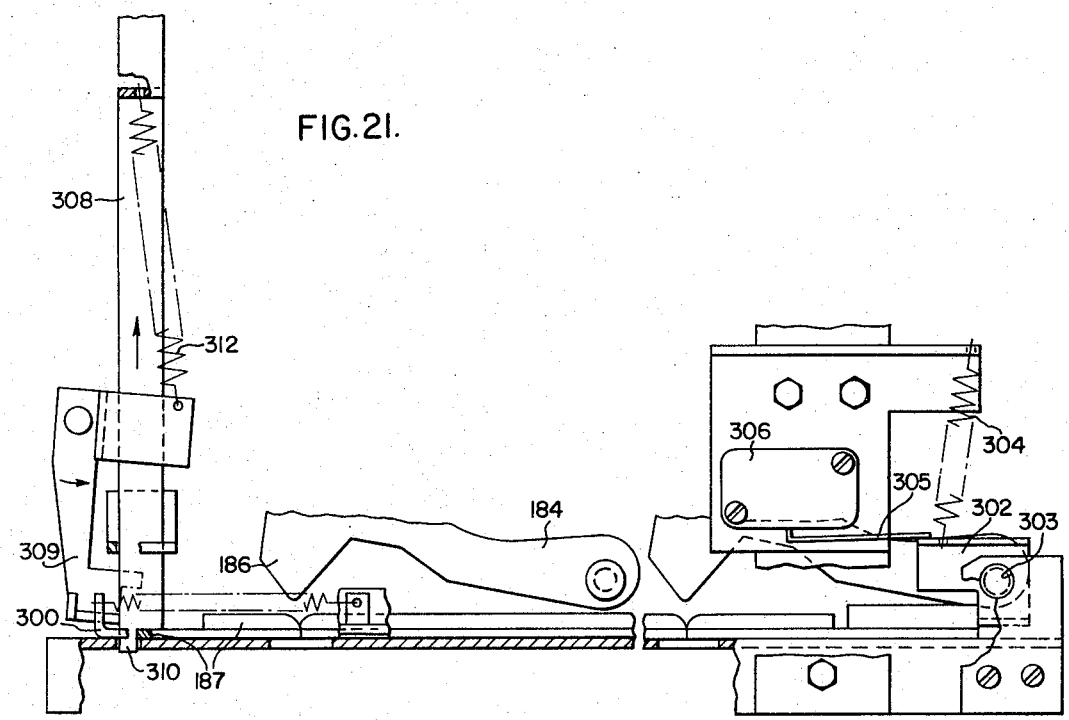
FIG. 21 is an elevational view partly broken away and partly in section to show the details of the unlocking trigger mechanism and the interlock mechanism with the locking mechanism parts shown in the locked position.
Figure 23:
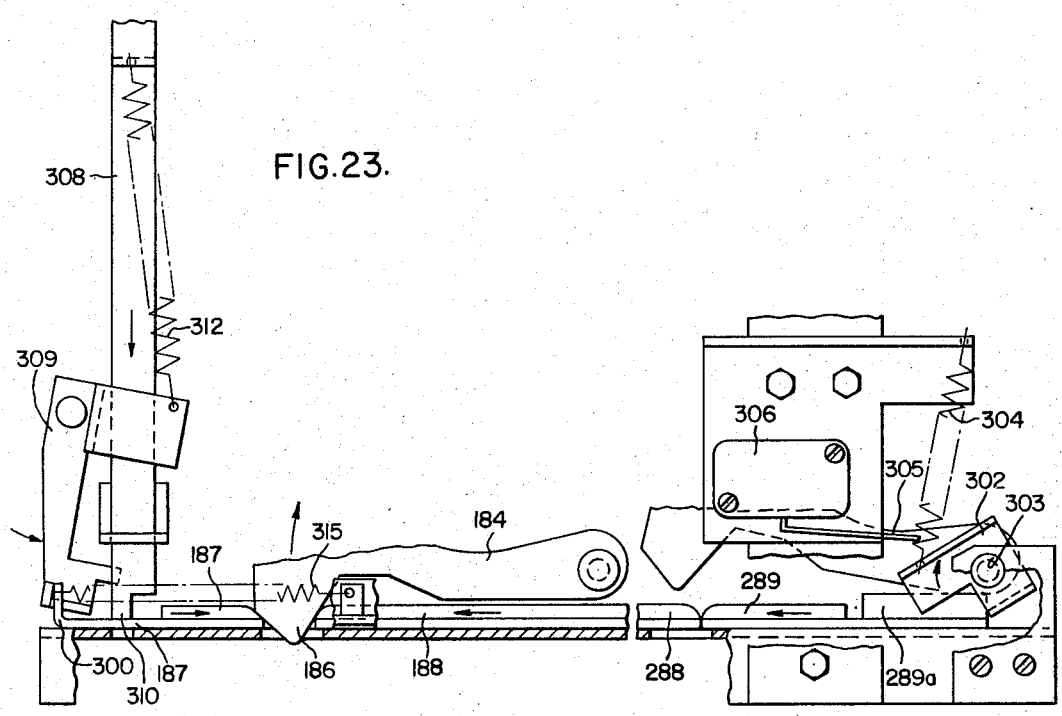
FIG. 23 is a view similar to FIG. 21 but showing the interlock slides in the position assumed while a single operating mechanism is being operated to vend an article from a single column of the magazine.

Now, with the trigger latch bar 308 in the raised and unlocked position as described in response to the momentary energization of the solenoid 307, the left-hand interlock slide blade 187 is free to move to the left, since the locking end surface 310 of the locking bar 308 as shown by FIG. 23 of the drawing, is withdrawn from engagement with the slide 188 as had been shown by FIG. 21 of the drawings. When a desired one of the article release mechanism is thereafter operated by the customer, the resultant movement of the interlock slides including the slide 187 to the left of FIGS. 22 and 23 of the drawings, causes the upturned end 300 of the interlock slide 187 to engage and pivot the latch member 309 in the direction of the arrows shown by FIG. 22 out from beneath the locking latch bar 308 whose end 310 is thereafter supported on the upper surface of the interlock slide 187. After the vending shaft has been returned to the counterclockwise direction to its normal locked position, and the interlock slide operating lever 184 has been raised, the interlock slide 187 again moves in the direction of the arrows shown by FIG. 23 of the drawing in response to the tension of the coil spring 315, thus allowing the latch bar 308 to drop downward in the direction of the arrows shown by FIG. 23 of the drawings to the position shown by FIG. 21 with its locking end surface 310 again engaging the end of the interlock blade 187 to prevent any further operation of the vending mechanism until additional coinage has been deposited to again momentarily energize the solenoid 307.

Figure 20:
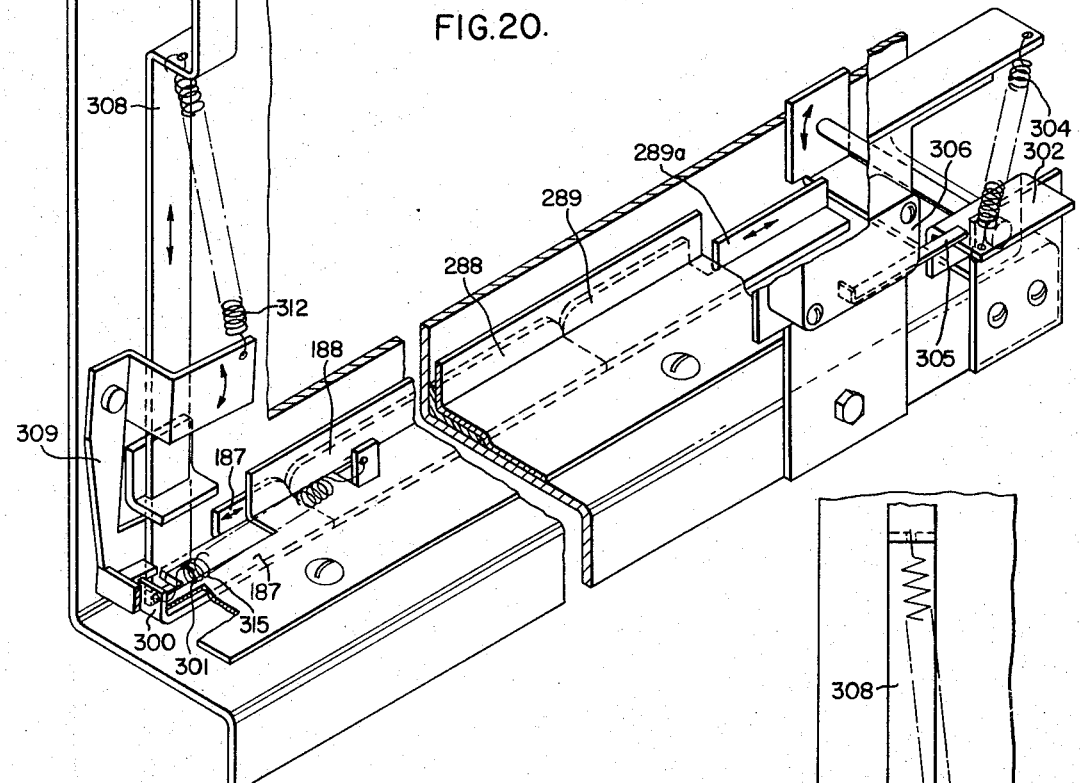
FIG. 20 is a fragmentary perspective elevational view partly broken away and partly in section to show the details of the vending machine unlocking mechanism and the interlock slides.
Figure 22:
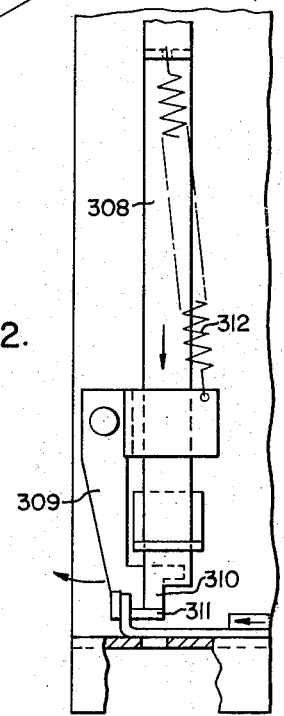
FIG. 22 is a fragmentary detailed view of the unlocking trigger mechanism with the parts shown in the unlocked position after coins have been deposited and before vending.

At the same time that various ones of the interlock slide blade including slide 187 are moving to the left of the drawings during the operation of the vending mechanism, other ones of the interlock slides including the extreme right-hand interlock slide 289 are moving to the right of FIGS. 20, 21 and 23 of the drawings to cause the pivoted bell crank 302 to pivot to the position shown by FIG. 23 of the drawings, thus disengaging the switch arm 305 and allowing the switch 306 to signal the coin control circuit (not shown) to be operated to reject any further coins sought to be deposited while the vending release mechanism is being operated. The coin controlled circuit and coin changer mechanism for momentarily energizing the vend solenoid 307 and to be further controlled by the switch 306 do not form a part of the present invention and a detailed description of such circuit is not given at this time since it is not necessary to an understanding of the mechanical vending mechanism of the invention as described. A suitable coin detector and changer mechanism that may be used with the machine of the invention is manufactured and sold by the National Rejectors Corp., of St. Louis, Mo., and referred to as their model 3400 series.

The foregoing description has described a novel form of manually operable vending machine specifically adapted to vend cylindrical articles such as bottles or cans. However, it should be obvious that the mechanism of this invention is not restricted to operation with cylindrical articles since it may be readily adapted to vend other forms of articles. Various modifications will occur to those skilled in the art.

I claim as my invention:

1. In a vending machine of the type for containing a substantially vertical row of a plurality of articles to be vended, the article release mechanism for vending the lowermost article in the vertical row comprising, an article support and locking member pivotally mounted on a pivot axis to one side and beneath the row of articles and having a normal position beneath the lowermost article in the row of articles to thereby support the row of articles and prevent movement of the lowermost article to a vending position and movable to an operated position out of engagement with the lowermost article to permit movement of the row of articles towards a vending position, a vend plate pivotally mounted on a pivot axis to one side and beneath the row of articles and having a normal position permitting passage of an article to be vended and movable to an operated position to engage the lowermost article of said row of articles as said articles move to the vending position when released by movement of said locking member to the operated position, manually rotatable operating means coupled to said locking member and vend plate to positively move said locking member and vend plate in timed relation to each other whereby said vend plate is first moved to the operated position and said locking member is next moved to the operated position as said operating means is rotated in one direction from a normal position and following which said vend plate is moved back to its normal position and said locking member is thereafter moved back to its normal position a predetermined time after said vend plate starts to move back to its normal position but before said vend plate has returned to its normal position as said operating means is rotated back in the other direction to the normal position whereby the locking member is moved back over the lowermost article then supported on the vend plate to its normal position for supporting all articles in the vertical row above the lowermost article on the vend plate being vended as said vend plate is moved completely back to its normal position, and means to adjust said operating means to thereby adjustably predetermine the time at which said locking member is moved back to its normal position and adjust to the vending of different size articles.

2. In a vending machine of the type for containing a substantially vertical row of a plurality of articles to be vended, the article release mechanism for vending the lowermost article in the vertical row comprising, an article support and locking member pivotally mounted on a pivot axis to one side and beneath the row of articles and having a normal position beneath the lowermost article in the row of articles to thereby support the row of articles and prevent movement of the lowermost article to a vending position and movable to an operated position out of engagement with the lowermost article to permit movement of the row of articles towards a vending position, a vend plate pivotally mounted on the same pivot axis as said locking member and having a normal position permitting passage of an article to be vended and movable to an operated position to engage the lowermost article of said row of articles as said articles move to the vending position when released by movement of said locking member to the operated position, manually rotatable operating means coupled to said locking member and vend plate to positively move said locking member and vend plate in timed relation to each other whereby said vend plate is first moved to the operated position and said locking member is next moved to the operated position as said operating means is rotated in one direction from a normal position and following which said vend plate is moved back to its normal position and said locking member is thereafter moved back to its normal position a predetermined time after said vend plate starts to move back to its normal position but before said vend plate has returned to its normal position as said operating means is rotated back in the other direction to the normal position whereby the locking member is moved back over the lowermost article then supported on the vend plate to its normal position for supporting all articles in the vertical row above the lowermost article on the vend plate being vended as said vend plate is moved completely back to its normal position and means to adjust said operating means to thereby adjustably predetermine the time at which said locking member is moved back to its normal position and adjust to the vending of different size articles.

3. A vending machine comprising, a column structure for containing a substantially vertical row of a plurality of necked bottle articles to be vended, an article support and locking member pivotally mounted on a pivot axis to one side and beneath said column structure and having a normal position beneath the lowermost article in said column to thereby support the row of articles and prevent movement of the lowermost article to a vending position and movable to an operated position out of engagement with the lowermost article to permit movement of the row of articles towards a vending position, a vend plate pivotally mounted on a pivot axis to one side and beneath said column structure and having a normal position permitting passage of an article to be vended and movable to an operated position to engage the lowermost article of said row of articles as said articles move to the vending position when released by movement of said locking member to the operated position, manually operable operating means coupled to said locking member and vend plate to positively move said locking member and vend plate in timed relation to each other whereby said vend plate is first moved to the operated position and said locking member is next moved to the operated position as said operating means is rotated in one direction from a normal position and following which said vend plate is moved back to its normal position and said locking member is moved back over the lowermost article then supported on the vend plate to its normal position for supporting all articles in the vertical row above the lowermost article on the vend plate being vended as said vend plate is moved completely back to its normal position upon rotation of the operating means back in the other direction to the normal position said column structure having a bottle neck guide extending the length of the structure in a position to substantially center the necks of the plurality of bottles to be contained within the column, and said neck guide having a means adjacent its lower end to deflect the neck of the bottle transversely of the column structure in a direction towards said locking member as it moves past said locking member onto said vend plate.

4. A vending machine comprising, a column structure for containing a substantially vertical row of a plurality of necked bottle articles to be vended, an article support and locking member pivotally mounted on a pivot axis to one side and beneath said column structure and having a normal position beneath the lowermost article in said column to thereby support the row of articles and prevent movement of the lowermost article to a vending position and movable to an operated position out of engagement with the lowermost article to permit movement of the row of articles towards a vending position, a vend plate pivotally mounted on the same pivot axis as said locking member to one side and beneath said column structure and having a normal position permitting passage of an article to be vended and movable to an operated position to engage the lowermost article of said row of articles as said articles move to the vending position when released by movement of said locking member to the operated position, manually operable operating means coupled to said locking member and vend plate to positively move said locking member and vend plate in timed relation to each other whereby said vend plate is first moved to the operated position and said locking member is next moved to the operated position as said operating means is rotated in one direction from a normal position and following which said vend plate is moved back to its normal position and said locking member is moved back over the lowermost article then supported on the vend plate to its normal position for supporting all articles in the vertical row above the lowermost article on the vend plate being vended as said vend plate is moved completely back to its normal position upon rotation of the operating means back in the other direction to the normal position said column structure having a bottle neck guide extending the length of the structure in a position to substantially center the necks of the plurality of bottles to be contained within the column, and said neck guide having a means adjacent its lower end to deflect the neck of the bottle transversely of the column structure in a direction towards said locking member as it moves past said locking member onto said vend plate.

5. A vending machine comprising, a plurality of side by side positioned column structures for containing a plurality of substantially vertical rows of a plurality of necked bottle articles to be vended, a respective articles support and locking member pivotally mounted on a pivot axis to one side and beneath a respective one of each of said columns and having a normal position beneath the lowermost article in a respective one of said columns to thereby support the row of articles and prevent movement of the lowermost articles to a vending position and movable to an operated position out of engagement with the lowermost article to permit movement of the row of articles towards a vending position, a respective vend plate pivotally mounted on a pivot axis to one side and beneath a respective one of said column structures, and having a normal position permitting passage of an article to be vended and movable to an operated position to engage the lowermost article of said row of articles as said articles move to the vending position when released by movement of said locking member to the operated position, a plurality of respective manually operable operating means each coupled to respective ones of said locking members and vend plates to positively move a respective one of said locking members and respective one of said vend plates for a respective one of said column structures in timed relation to each other whereby the respective vend plate is first moved to the operated position and the respective locking member is next moved to the operated position as the respective operating means is rotated in one direction from a normal position and following which the respective vend plate is moved back to its normal position and the respective locking member is moved back over the lowermost article then supported on the vend plate to its normal position for supporting all articles in the respective vertical row above the lowermost article on the vend plate being vended as the respective vend plate is moved completely back to its normal position upon rotation of the respective operating means back in the other direction to a normal position, interlock means interconnecting each of said respective operating means to prevent concurrent operation of more than one of said operating means each of said column structures having a respective bottle neck guide extending the length of the respective column in a position to substantially center the necks of the plurality of bottles to be contained within a respective column, and each of said neck guides having means adjacent their lower ends to deflect the neck of a bottle transversely of the respective column in a direction towards said locking member as the bottle moves past the respective locking member onto the respective vend plate.

6. A vending machine comprising, a plurality of side by side positioned column structures for containing a plurality of substantially vertical rows of a plurality of necked bottle articles to be vended, a respective article support and locking member pivotally mounted on a pivot axis to one side and beneath a respective one of each of said columns and having a normal position beneath the lowermost article in a respective one of said columns to thereby support the row of articles and prevent movement of the lowermost article to a vending position and movable to an operated position out of engagement with the lowermost article to permit movement of the row of articles towards a vending position, a respective vend plate pivotally mounted on the same pivot axis as the said respective locking member to one side and beneath the respective one of said columns and having a normal position permitting passage of an article to be vended and movable to an operated position to engage the lowermost article of said row of articles as said articles move to the vending position when released by movement of the said locking member to the operated position, a plurality of respective manually operable operating means each coupled to respective ones of said locking members and vend plates to positively move a respective one of said locking members and respective one of said vend plates for a respective one of said columns in timed relation to each other whereby the respective vend plate is first moved to the operated position and the respective locking member is next moved to the operated position as the respective operating means is rotated in one direction from a normal position and following which the respective vend plate is moved back to its normal position and the respective locking member is moved back over the lowermost article then supported on the vend plate to its normal position for supporting all articles in the respective vertical row above the lowermost article on the vend plate being vended as the respective vend plate is moved completely back to its normal position upon rotation of the respective operating means back in the other direction to the normal position, interlock means interconnecting each of said respective operating means to prevent concurrent operation of more than one of said operating means each of said column structures having a respective bottle neck guide extending the length of the respective column in a position to substantially center the necks of the plurality of bottles to be contained within a respective column, each of said neck guides having means adjacent their lower ends to deflect the neck of a bottle transversely of the respective column in a direction towards said locking member as the bottle moves past the respective locking member onto the respective vend plate, and a respective adjusting plate pivotally secured to one side within the lower portion of each of said columns to adjustably predetermine the outlet width of the respective column adjacent the normal position of the respective locking member.

7. A vending machine comprising, a column structure for containing a substantially vertical row of a plurality of necked bottle articles to be vended, an article support and locking member pivotally mounted on a pivot axis to one side and beneath said column structure and having a normal position beneath the lowermost article in said column to thereby support the row of articles and prevent movement of the lowermost article to a vending position and movable to an operated position out of engagement with the lowermost article to permit movement of the row of articles towards a vending position, a vend plate pivotally mounted on the same pivot axis as said locking member to one side and beneath said column structure and having a normal position permitting passage of an article to be vended and movable to an operated position to engage the lowermost article and said row of articles as said articles move to the vending position when released by movement of said locking member to the operating position, manually operable operating means coupled to the said locking member and vend plate to positively move said locking member and vend plate in timed relation to each other whereby said vend plate is first moved to the operated position and said locking member is next moved to the operated position as said operating means is rotated in one direction from a normal position and following which said vend plate is moved back to its normal position and said locking member is moved back over the lowermost article as supported on the vend plate to its normal position for supporting all articles in the vertical row above the lowermost article being vended on the vend plate as said vend plate is moved completely back to its normal position upon rotation of the operating means back in the other direction to the normal position, said column structure having a bottle neck guide extending the length of the structure in a position to substantially center the necks of the plurality of bottles to be contained within the column, said neck guide having a means adjacent its lower end to deflect the neck of the bottle transversely of the column structure in a direction towards said locking member as it moves past said locking member onto said vend plate, and an adjusting plate pivotally secured to one side within the lower portion of said column to adjustably predetermine the output width of the column adjacent the normal position of said locking member.

References Cited
UNITED STATES PATENTS

| | | | |
|---|---|---|---|
| 1,145,458 | 7/1915 | Antoine et al. | 221—298 |
| 1,330,639 | 2/1920 | Leumann | 221—298 |
| 1,944,499 | 1/1934 | Crimp | 221—298 X |
| 1,969,170 | 8/1934 | Erickson | 221—242 |
| 2,604,577 | 7/1952 | Strickland et al. | 221—298 |
| 2,735,096 | 2/1956 | Miller | 221—298 X |
| 2,903,155 | 9/1959 | Whitefield | 221—115 |
| 3,175,728 | 3/1965 | Lindsey et al. | 221—298 X |
| 3,203,588 | 8/1965 | O'Neal | 221—298 X |
| 3,251,505 | 5/1966 | Johnson et al. | 221—298 X |

SAMUEL F. COLEMAN, *Primary Examiner.*